United States Patent
Beamer

Patent Number: 5,246,202
Date of Patent: Sep. 21, 1993

[54] DRAINCOCK ASSEMBLY

[75] Inventor: Henry E. Beamer, Middleport, N.Y.

[73] Assignee: General Motors Corporation, Detroit, Mich.

[21] Appl. No.: 901,298

[22] Filed: Jun. 19, 1992

[51] Int. Cl.$^5$ ............................................. F16K 31/528
[52] U.S. Cl. .................................. 251/252; 251/297; 251/904; 165/71
[58] Field of Search .................. 165/71; 251/144, 252, 251/904, 297; 222/549, 551, 552

[56] References Cited

U.S. PATENT DOCUMENTS

| | | | |
|---|---|---|---|
| 1,503,132 | 7/1924 | Prator | 251/252 |
| 4,679,618 | 7/1987 | Farkas | 165/71 |
| 5,096,158 | 3/1992 | Burdick et al. | 251/904 |

*Primary Examiner*—John Rivell
*Attorney, Agent, or Firm*—Ronald L. Phillips

[57] ABSTRACT

A draincock assembly is designed so it may be molded with the radiator tank. The draincock assembly includes a drain for draining fluid from the heat exchanger. The drain includes a cam surface which receives a pin of a draincock therein. The draincock moves rotationally about and axially along a longitudinal axis defined by the drain between open and closed positions in a path defined by the pin moving along the cam surface. A detent is molded to the cam surface and prevents movement of the pin of the draincock therepast unless a rotational force is applied to the handle of the draincock. An O-ring at the end of the cylindrical body of the draincock provides a seal wherein no fluid may exit through the drain nipple until the O-ring moves past the drain nipple, creating a drainage path from the radiator tank.

1 Claim, 2 Drawing Sheets

DRAINCOCK ASSEMBLY

BACKGROUND OF THE INVENTION

1. Technical Field

The subject invention relates to draincocks. More particularly, the subject invention relates to a draincock integrated with a fluid vessel, such as a motor vehicle radiator.

2. Background Art

Liquid vessels such as motor vehicle radiators, and the like, typically have a draincock that threads into a drain hole. Such an embodiment is disclosed in U.S. Pat. No. 1,503,132 to Prator, issued Jul. 29, 1924, wherein a valve is threadably secured to a fluid system. The valve is opened and closed by the movement of a lever through a cam surface. This assembly is undesirable because threadingly securing a valve to a system requires very precise equipment to monitor the orientation of the valve and the torque applied to the valve as it is secured into the system. In addition, the method of threadably securing the valve to the system increases the time needed to manufacture the part, i.e., the cycle time of manufacturing increases, which decreases productivity.

U.S. Pat. No. 4,679,618 to Farkas, issued Jul. 14, 1987, discloses a draincock assembly which eliminates threadingly securing the draincock assembly to the fluid vessel. This draincock, however, is operated with axial motion as opposed to rotary motion which requires increased operator skill and is prone to improper operation.

SUMMARY OF THE INVENTION AND ADVANTAGES

A draincock assembly is fixedly secured to a fluid vessel for draining fluid therefrom. The assembly comprises fluid vessel means for storing a fluid therein. Drain means is fixedly secured to the fluid vessel means and allows the fluid stored in the fluid vessel means to pass therethrough. Draincock means selectively allows the fluid to pass through the drain means wherein the assembly is characterized by guiding means fixedly secured to the drain means for guiding the draincock means into a sealing position upon insertion of the draincock means into the drain means to prevent the fluid from passing through the drain means.

The advantages associated with the subject invention include a cost reduction due to a reduction in tooling, cycle time for manufacturing and waste which is associated with the parts which are not properly screwed into the vessel. In addition, costs due to inventory are also reduced.

BRIEF DESCRIPTION OF THE DRAWINGS

Other advantages of the present invention will be readily appreciated as the same becomes better understood with reference to the following description when considered in connection with the accompanying drawings wherein.

DETAILED DESCRIPTION OF THE DRAWINGS

Figure 1:
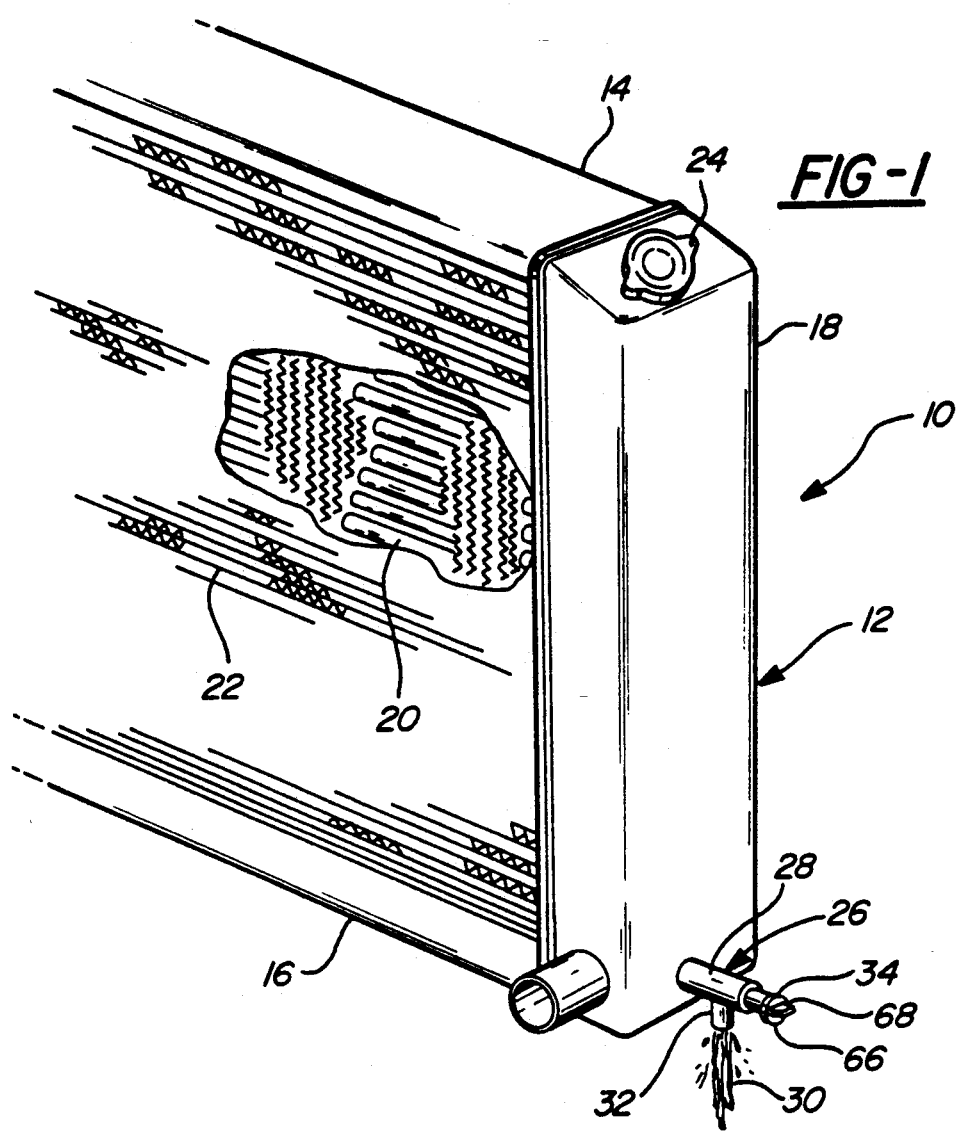
FIG. 1 is a perspective view of the preferred embodiment of the subject invention.

Referring to FIG. 1, the subject invention is generally shown at 10. The subject invention is a draincock assembly 26 which is fixedly secured to a fluid vessel, generally shown as a coolant radiator at 12. The fluid vessel 12 includes top 14 and bottom 16 supports with two tanks 18 (one shown) disposed perpendicularly between the two supports 14,16 at either end of the supports 14,16. The tanks 18 are in fluid communication with tubing 20 which are arranged in spaced parallelism and are connected between the two tanks 18. Heat-exchanging fins or air centers 22 are disposed between the parallel tubes 20. The heat-exchanging fins 22 are bonded to the tubes 20 so as to increase the surface area of the tubes 20 to transfer the thermal energy stored in the fluid within the tanks 18 more readily, as is well-known in the art. A cap 24 provides access to the tanks 18 so fluid may be added thereto. In addition to the fluid vessel means 12, for storing fluid therein, a draincock assembly, generally shown at 26, is provided to allow the fluid stored within the tanks 18 to be flushed therefrom. The draincock assembly 26 includes drain means 28 for draining the tanks 18 when the fluid, shown leaving the tanks 18 at 30, is old and contaminated. A down spout 32 is attached to the drain means 28 to direct the fluid 30 vertically downwardly from the coolant radiator 12. The draincock assembly 26 further includes draincock means 34 for selectively allowing the fluid 30 to pass through the drain means 28. More specifically, the draincock means 34 is movable between extended and retracted positions to open and close the drain means 28 to the fluid vessel 12.

Figure 2:
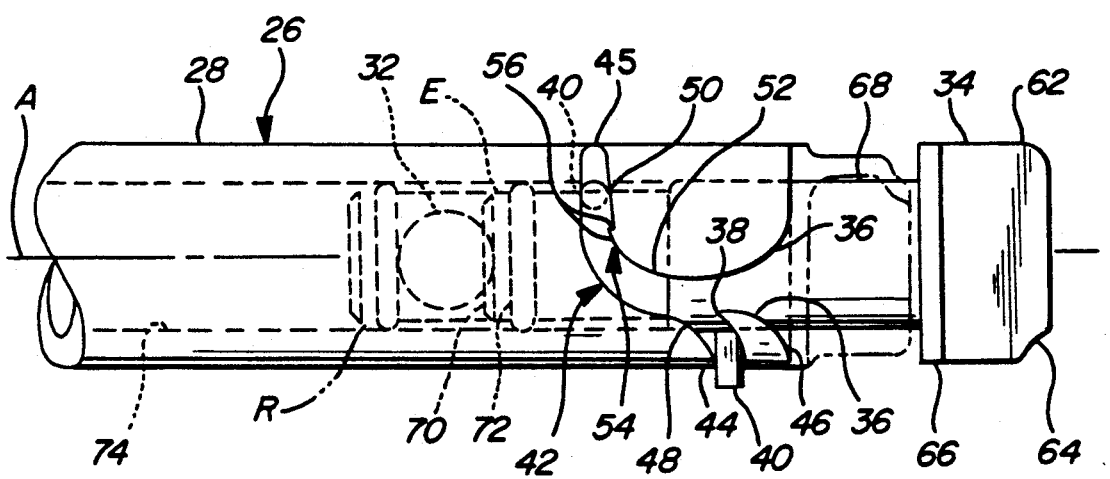
FIG. 2 is a plan view of the preferred embodiment of the subject invention partially cut away showing the draincock assembly in its two positions.
Figure 3:
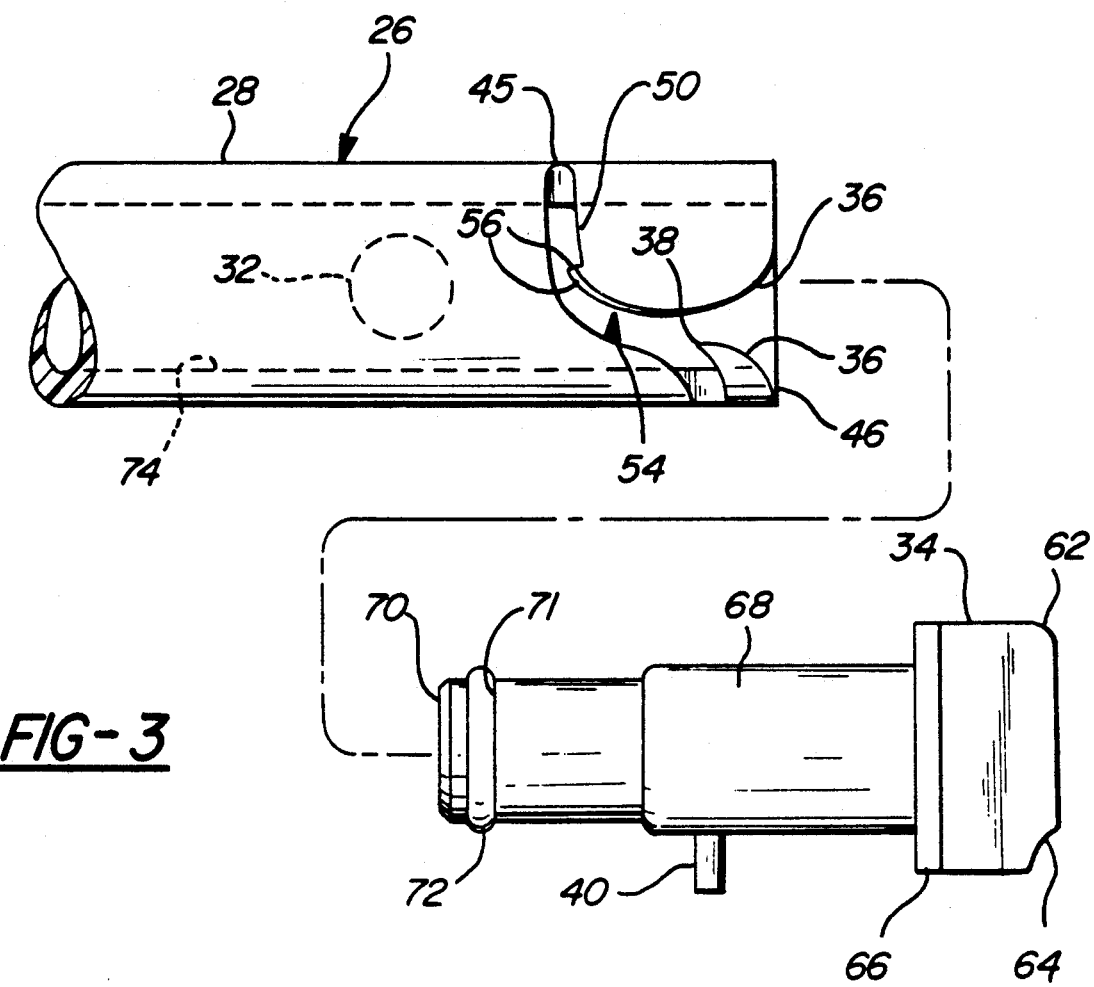
FIG. 3 is an exploded plan view of the preferred embodiment of the subject invention partially cut away.
Figure 3A:
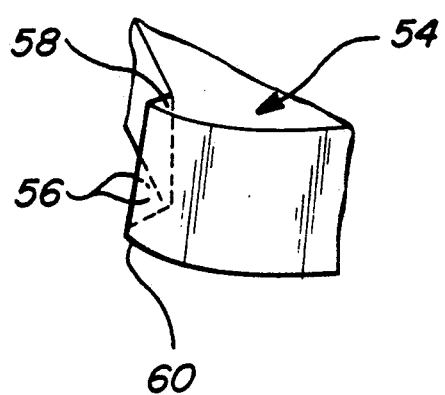
FIG. 3A is an enlarged fragmentary perspective view of a detent in the subject invention.

The draincock assembly 26 is characterized by guide means 36, seen best in FIG. 2, internally formed in the drain means 28 for guiding the draincock means 34 into a retracted sealing position upon insertion of the draincock means 34 into the drain means 28 to prevent the fluid 30 from passing through the drain means 28. More specifically, the guide means 36 allows the draincock means 34 to be inserted into the drain means 28 to seal the draincock assembly 26 without the use of any machinery such as torque-control screw devices which are required if the assembly must be screwed into the tanks 18. The guide means 36 includes a resilient end 38 which elastically deflects to allow a pin 40, that is fixedly secured to the draincock means 34 (discussed subsequently) to pass therepast. Once the pin 40 has passed the resilient end 38 of the guide means 36, the resilient end 38 moves back to its original position so as to retain the pin 40 in place with the guide means 36. Accordingly, once the draincock means 34 is inserted into the drain means 28 past the resilient portion 38, the draincock means 34 cannot be easily removed. The aforedescribed arrangement prevents inadvertent separation of the draincock means 34 from the radiator so as to prevent misdirection of fluid from a lateral exit point.

The drain means 28 as seen in FIG. 2 is a drain tube 28 that includes a cam surface, generally shown at 42, which is arranged with respect to the guide means 36 such that all of the cam surface 42 and the surfaces of the guide means 36 have the same line of draw. The line of draw, as defined in this disclosure is a line of direction in which a mold is removed from a mold part. Since the cam surfaces 42 and the surfaces of guide means 36 have the same line of draw fewer die parts are required to produce the draincock assembly 10 because one die piece can produce the entire side of the drain means 28 into which the cam surface 42 and guide surface 36 are molded. The cam surface 42 extends up to 180° of the circumference of the drain means 28 to provide a sufficient stroke between the retracted (R) and extended (E) positions of the draincock means 34 as best shown in FIG. 2.

In the preferred embodiment, a drain opening in the form of a down spout provides a directional pathway for the fluid 30 to pass therethrough. The down spout 32 includes at least one side which is cylindrical in shape, although other cross-sectional designs of down spouts are not a part of the subject invention. The down spout 32 will have the same line of draw as the cam surface 42. More specifically, the line of draw of the down spout 32 will be that of the cam surface 42 to eliminate the need for extra molding pieces which will be necessary if a single mold piece could not be used to mold all the surfaces.

The cam surface 42 thus provides a pathway for the pin 40 which allows the draincock 34 to move between the open (extended) position (E) and closed (retracted) position (R). As may be seen in FIG. 2, the draincock 34 is in the open position when the pin 40 is moved to the uppermost portion 44 of the cam surface 42 which is closest to the exterior end 46 of the drain tube 28. When the draincock 34 is moved to the closed (retracted) position (R), the pin 40 is in the lowermost portion 45 of the cam surface 42 as defined by being the furthest portion of the cam surface 42 from the end 46 of the drain tube 28. The draincock 34 is shown in the closed (retracted) position (R) in phantom in FIG. 2. The cam surface includes open 48 and closed 50 portions which extend substantially perpendicularly with respect to the longitudinal axis A of the drain tube 28. The open 48 and closed 50 portions are spaced from one another, but are connected by a connecting channel 52 which extends between the open 48 and closed 50 positions such that the connecting channel 52 is slightly inclined with respect to the longitudinal axis A. The connecting channel 52 also merges into the guide means 36.

A detent 54 is molded in the closed portion 50 of the cam surface 42. The detent 54 is disposed adjacent the connecting channel 52. Specifically, the detent 54 is molded in the cam surface 42 at the point where the connecting channel 52 becomes the closed portion 50 of the cam surface 42. The detent 54 prevents the draincock 34 from moving out of the closed (retracted) position (R), i.e., out of the closed portion 50 of the cam surface 42 into the connecting channel 52. The detent 54 includes a plurality of sides 56 which extend along the same line of draw as the line of draw of the cam surface 42. The detent 54, therefore, does not necessitate additional mold die pieces to perform the draw mold process.

In the preferred embodiment of the subject invention 10, the plurality of sides 56 of the detent 54 will extend toward the center of the cam slot which is the region bounded by the inner and outer cam surfaces and oriented in the line of draw of the cam surface 42. The sides 56 define a tip 58 on the detent 54 that is smaller than the base 60 of the detent 54. Accordingly, the load or pressure imposed on the detent 54 by the pin 40 of the draincock 34 is directed at the base 60 for reducing the stress levels within the detent 54.

The pin 40 can be tapered such that the base of the pin 40 will bear against the cam surface 42 at the detent stop positions so that the force exerted on the pin 40 will be received at the base of the pin 40. Alternatively, if desired, the cam surface 42 can be tapered at the detent stop positions to engage a straight pin at its base for the same purpose. Alternatively, the pin 40 can be an insert molded metal pin which will also increase the torque resistance.

The draincock means 34 includes a flat handle 62 with a notch 64 removed from a corner of the flat handle 62. The notch 64 is in the same plane as the pin 40 so it may be a tactile indicator of the position of the pin 40. The draincock 34 further includes a disk 66 disposed adjacent the handle 62 and perpendicular therewith which aids the operator when inserting the draincock 34 into the drain 28. The disk 66 thus provides a surface 68 for applying a force to insert the draincock 34 into the drain 28. The draincock 34 includes a cylindrical body 68 disposed adjacent the disk 66 and, when inserted into the drain 28, extends along the same longitudinal axis A as the drain 28. The distal end 70 of the cylindrical body 68 includes an O-ring groove 71 which holds an O-ring 72 that provides a seal between the inner walls 74 of the drain 28 and a cylindrical body 68 of the draincock 34. Therefore, when the draincock 34 is moved from the closed (retracted) position (R) to the open position, the O-ring 72 passes over the down spout 32 of the drain 28 allowing the fluid 30 to pass through the drain 28 and out the down spout 32. When the draincock 34 is moved from the open position (E) to the closed (retracted) position (R), the O-ring 72 is moved back over the down spout 32 and seals the tank 18 from the down spout 32.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not be to in any way limiting, the invention may be practiced otherwise than as specifically described.

What is claimed:

1. A draincock assembly for a fluid vessel, comprising,
   a generally cylindrical drain tube extending from said vessel including an exterior end and a down spout spaced therefrom,
   a draincock axially movable within said drain tube and having a pin projecting from the side thereof,
   said drain tube further having a cam slot defined therein in which said draincock pin is movable, including an outer portion near the drain tube exterior end extending generally perpendicularly to said drain tube axis, a similarly oriented inner portion axially and angularly spaced from the outer portion, and a connecting portion extending therebetween and slightly inclined relative to said drain tube axis, the axial spacing of said outer and inner cam slot portions being sufficient to carry said draincock from an extended position blocking said down spout when said pin is in said inner cam slot portion to a retracted position uncovering said down spout when side pin is in said outer cm slot portion, said cam slot further having all surfaces oriented on the same line of draw, and, a detent molded in said inner cam slot portion for preventing said draincock pin from moving out of said inner cam slot portion, said detent including a plurality of sides extending inwardly toward the line of draw within a perimeter defined by said plurality of sides of said detent such that said detent includes a base having a greater cross-sectional area than the remainder of said detent.

* * * * *